United States Patent
Van Zon

(10) Patent No.: US 9,704,005 B2
(45) Date of Patent: Jul. 11, 2017

(54) READER FOR AN ELECTRONIC UHF ACCESS CONTROL SYSTEM

(71) Applicant: N.V. Nederlandsche Apparatenfabriek "Nedap", Groenlo (NL)

(72) Inventor: Bernardus Clemens Maria Van Zon, Groenlo (NL)

(73) Assignee: N.V. NEDERLANDSCHE APPARATENFABRIEK "NEDAP", Groenlo (NL)

( * ) Notice: Subject to any disclaimer, the term of this patent is extended or adjusted under 35 U.S.C. 154(b) by 0 days.

(21) Appl. No.: 15/021,816

(22) PCT Filed: Sep. 18, 2014

(86) PCT No.: PCT/NL2014/050639
§ 371 (c)(1),
(2) Date: Mar. 14, 2016

(87) PCT Pub. No.: WO2015/041525
PCT Pub. Date: Mar. 26, 2015

(65) Prior Publication Data
US 2016/0232388 A1  Aug. 11, 2016

(30) Foreign Application Priority Data
Sep. 18, 2013  (NL) ...................................... 2011462

(51) Int. Cl.
*G06K 7/10* (2006.01)
*H01Q 1/22* (2006.01)
(Continued)

(52) U.S. Cl.
CPC ..... *G06K 7/10415* (2013.01); *G06K 7/10346* (2013.01); *H01Q 1/2216* (2013.01);
(Continued)

(58) Field of Classification Search
CPC ........ H01Q 1/2216; H01Q 21/24; H01Q 9/42; G06K 7/01; G06K 7/10316; G06K 7/10346; G06K 7/10415
(Continued)

(56) References Cited

U.S. PATENT DOCUMENTS

| | | | | |
|---|---|---|---|---|
| 7,468,709 B2 * | 12/2008 | Niemi | .................... | H01Q 1/243 343/702 |
| 7,501,983 B2 * | 3/2009 | Mikkola | ................ | H01Q 1/243 343/700 MS |

(Continued)

FOREIGN PATENT DOCUMENTS

| | | |
|---|---|---|
| WO | 2012/025787 A1 | 3/2012 |
| WO | 2013/117994 A1 | 8/2013 |

OTHER PUBLICATIONS

Oxford English Dictionary Definition of "Plane", accessed by Examiner on Oct. 13, 2016 at https://en.oxforddictionaries.com/definition/plane.*

(Continued)

*Primary Examiner* — Claude J Brown
(74) *Attorney, Agent, or Firm* — Jacobson Holman, PLLC.

(57) ABSTRACT

Reader for an electronic UHF access control system, wherein the reader in operation cooperates with corresponding UHF tags and is provided with a housing, in which an antenna system for creating an electromagnetic interrogation field is arranged, wherein the antenna system comprises a first antenna for generating an interrogation field with a first polarization direction, and a second antenna for generating an interrogation field with a second polarization direction, wherein the first and the second polarization directions are substantially orthogonal to each other, and wherein the first antenna is a loop antenna with an open central area, and the second antenna is an antenna of the inverted F type (IFA), which is placed in the open central area of the loop antenna.

15 Claims, 12 Drawing Sheets

(51) Int. Cl.
*H01Q 21/24* (2006.01)
*H01Q 9/42* (2006.01)
*G06F 17/00* (2006.01)
*G07C 9/00* (2006.01)

(52) U.S. Cl.
CPC ............... *H01Q 9/42* (2013.01); *H01Q 21/24* (2013.01); *G07C 9/00896* (2013.01)

(58) Field of Classification Search
USPC .......................................................... 235/375
See application file for complete search history.

(56) References Cited

U.S. PATENT DOCUMENTS

| | | | | |
|---|---|---|---|---|
| 8,967,472 | B2* | 3/2015 | Brasher | G06K 7/10316 235/439 |
| 9,123,990 | B2* | 9/2015 | Ramachandran | H01Q 1/243 |
| 2009/0096680 | A1 | 4/2009 | Bellows | |
| 2009/0174557 | A1* | 7/2009 | Nikitin | G06K 7/10316 340/572.7 |
| 2011/0148722 | A1 | 6/2011 | Bellows | |
| 2013/0076573 | A1* | 3/2013 | Rappoport | H01Q 1/243 343/702 |
| 2013/0293424 | A1* | 11/2013 | Zhu | H01Q 1/243 343/702 |
| 2014/0054378 | A1* | 2/2014 | Bellows | G01S 1/74 235/439 |

OTHER PUBLICATIONS

Definition of "Plane" from Merram-Webster Dictionary, May 10, 2017 from https://www.merriam-webster.com/dictionary/plane.*
Euclid's Elements of Plane Geometry Book I, With Explanatory Appendix, and Supplementary Propositions by W.D. Cooley (London: Whittaker and Co. 1840) May 10, 2017 from Google Books at https://play.google.com/books/reader?id=E9sDAAAAQAAJ&printsec=frontcover&output=reader&hl=en&pg=GBS.PA16.*
International Search Report, dated Dec. 19, 2014 (3 pages).

* cited by examiner

READER FOR AN ELECTRONIC UHF ACCESS CONTROL SYSTEM

The invention relates to a transceiver (reader) for an Ultra High Frequency (UHF) access control system, wherein the reader in operation cooperates with corresponding UHF tags, and is provided with a housing, in which an antenna system for creating an electromagnetic interrogation field is arranged.

BACKGROUND OF THE INVENTION

Identification by means of radio signals (RFID (=Radio Frequency Identification) has been used for many years for various applications. RFID systems can be designed for different frequency ranges. Low-frequency (LF) systems operate, for instance, in the 120 kHz band, while high-frequency (HF) systems can operate, for instance, in the 13.58 MHz band. Microwave systems (MW) operate in the GHz range.

A recent trend in the RFID branch is ultrahigh frequency (UHF) RFID in, for instance, the 860 to 950 MHz band. However, there are also UHF systems known that operate in other UHF bands, such as, for instance, the 400 to 450 MHz band.

The invention relates to UHF RFID devices.

RFID tags, also called labels, passes, detection plates, responders, badges, transponders, etc., exist in many divergent shapes and dimensions. Such tags can be of the active, semi-active or passive type.

Active tags have a battery and typically emit their identification signal intermittently. Semi-active tags also have a battery, but emit their identification signal only in response to a signal received from a transceiver device, also referred to as interrogator and referred to as reader in the following description and claims. Such a signal can be an interrogation field, also called detection field, that is broadcast continuously by the reader, but can also be an intermittently broadcast field. Passive tags have no battery and utilize the energy emitted by a reader to provide their RFID chip with supply energy. The invention is in particular, though not exclusively, suitable for use in access control systems, which utilize passive tags.

Low-frequency passive tags can be read out contactlessly over distances of up to about 1 meter. Passive high-frequency RFID tags generally have a shorter maximum reading distance of a few decimeters. Active or semi-active tags can be read out at a greater distance than passive tags. A readout distance of 10 m is no exception. A drawback of the use of active or semi-active tags is that these tags are more complicated than passive tags and hence considerably more expensive. Also, the necessity of using a battery in a (semi-)active tag is a drawback.

Users of access control systems, such as, for instance, person access control systems, have a need for systems that are suitable for passive tags, while yet allowing a handsfree use of the system. 'Handsfree' in this connection means that the tag does not need to be presented to the reader at a very short distance and/or in a predetermined orientation. In the concrete, for a person access control system, this means that a person carrying a pass belonging to the access control system can leave it attached to his clothes, or leave it hanging from a cord around his neck, or the like, and that the pass can then be recognized by the system nonetheless. However, this is always subject to the condition that the UHF pass has no direct contact with the person's body and is always in line of sight (LOS), whether or not blocked by clothes or the like, with the reader concerned.

The conditions for a proper operation of a system envisaged as a handsfree RFID reader system include a great reading distance and a free orientation of the tags (labels, passes, detection plates, responders, transponders, etc.). Free orientation in this connection means complete rotational freedom about the line of sight (LOS), and a limited rotational freedom about axes perpendicular to the line of sight up to an angle in the order of 45° with respect to the line of sight.

To enable tag detection independent of the orientation of the tag, the antenna system of the reader should have an antenna gain and a band width that are approximately equal for two orthogonal polarization directions. In a practical situation, the two polarization directions will typically be formed by a horizontal and a vertical field component.

In addition, there is a need for the smallest possible dimensions of the readers. In practice, users ask for a reader that fits on a standard door frame post. This is to say that such a reader in practice should have a width in the order of 5 cm or less.

While LF and HF readers are available in small dimensions, fitting on a door frame post, these known readers have a very limited reading distance of only a few decimeters.

Summarizing, therefore, a need exists for a reader for a UHF RFID access control system, where the reader is to be suitable for handsfree use of tags belonging to the UHF RFID system, where it must be possible for the tags to be of the passive type and to be read out at a relatively large distance in the order of a few meters, and where the reader has a small width, which, in the case of use in e.g. an access control system, for persons, fits on a door frame post of conventional dimensions.

BRIEF SUMMARY OF THE INVENTION

The object of the invention is to provide for this need. To this end, according to the invention, a transceiver (reader) of the kind referred to in the opening paragraph hereof is characterized in that the antenna system comprises a first antenna for generating an interrogation field with a first polarization direction, and a second antenna for generating an interrogation field with a second polarization direction, wherein the first and the second polarization directions are substantially orthogonal to each other, and wherein the first antenna is a loop antenna with an open central area, and the second antenna is an antenna of the inverted F type (IFA), which is placed in the open central area of the loop antenna.

BRIEF DESCRIPTION OF THE SEVERAL VIEWS OF THE DRAWINGS

In the following, the invention will be further described with reference to the appended drawing of an exemplary embodiment.

FIG. 2 shows schematically a cross section along the line II-II in FIG. 1a;

DETAILED DESCRIPTION OF THE INVENTION

It is noted that the invention will be described in the following in the context of an application example, which concerns a UHF reader of a person access control system, whereby the reader can be mounted on a door frame post and then does not project outside the frame post. Such a reader should have a width (horizontal dimension) in the order of 5 cm or less. The length (vertical dimension) can be, for instance, in the order of 15 cm. Other applications than in a person access control system are possible, of course, for instance for animals, moving or movable objects, vehicles, etc., which are to be enabled to pass a closable passage.

Furthermore, the reader described below as an example is designed for cooperation with passive tags. These may for instance be tags of the type UHF EPC Class 1 Gen 2, where 'EPC' means Electronic Product Code and 'Gen' Generation. With such tags, as such, reading distances in the order of 8 m are possible.

In principle, however, also semi-active or active tags can be used in combination with a reader according to the invention.

Figure 1A:
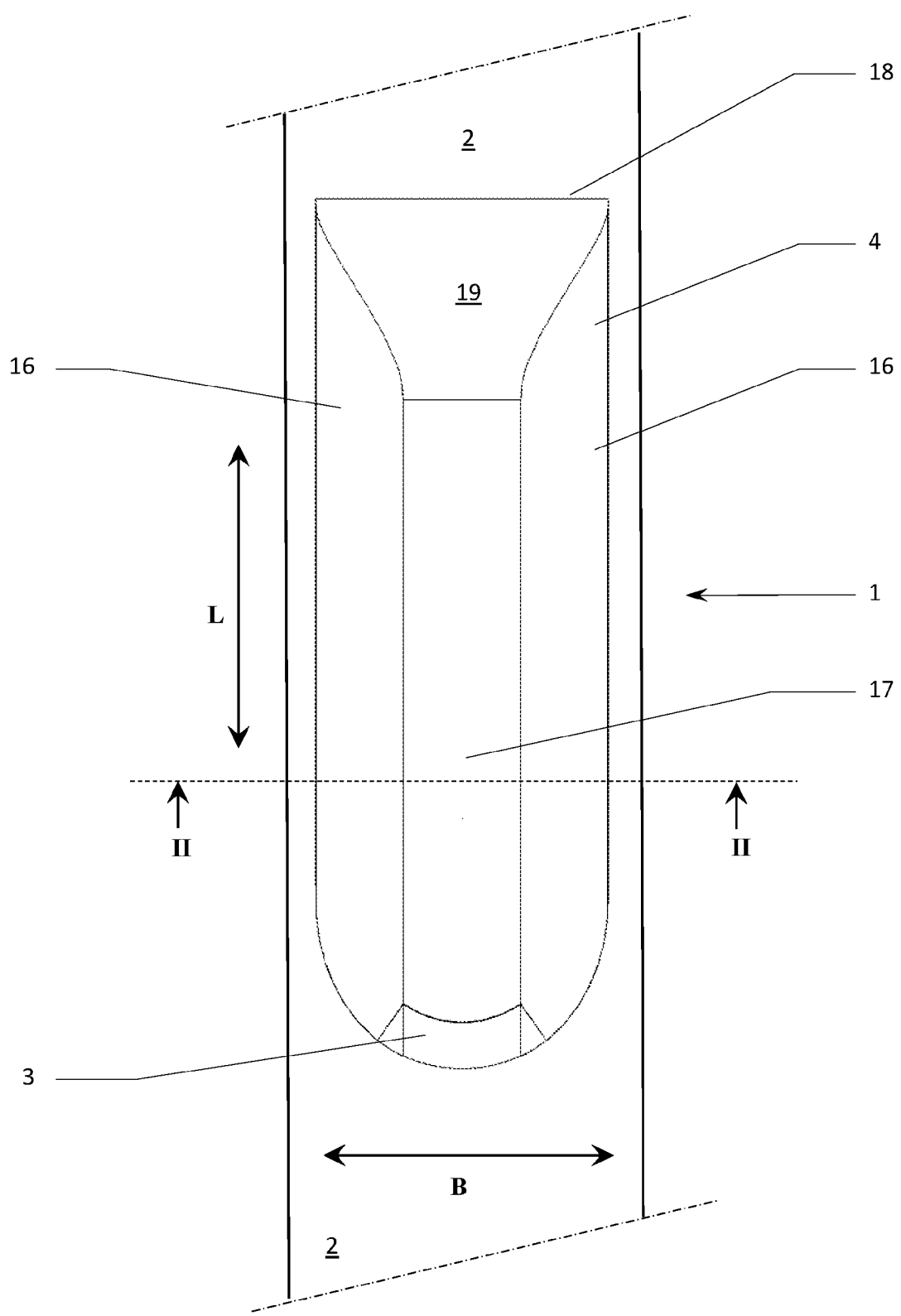
FIG. 1 shows schematically in front view (FIG. 1a) and in side view (FIG. 1b) an example of a reader according to the invention mounted on a door frame post.

FIG. 1 shows schematically in front view and side view an example of a reader 1 according to the invention. The reader 1 shown has an elongate shape and is mounted on a partly shown door frame post 2 and in this example serves to read out electronic passes carried by persons. Depending on the data read by the reader and checked by the person access control system, of which the reader is a part, the passage through a door, not shown, in the frame of the frame post 2 is cleared or not. 'Door' is understood to mean any type of movable barrier in a passage, such as a swing door, a revolving door, a sliding door, and turnstile, etc. In the example shown, the reader is provided at the underside thereof with a transparent portion 3, via which it can be indicated with an optical signal that a pass has been read and/or that access is or is not authorized. Also possible for such purposes is the use of an acoustic signal, alone or in combination with an optical signal.

Figure 1B:
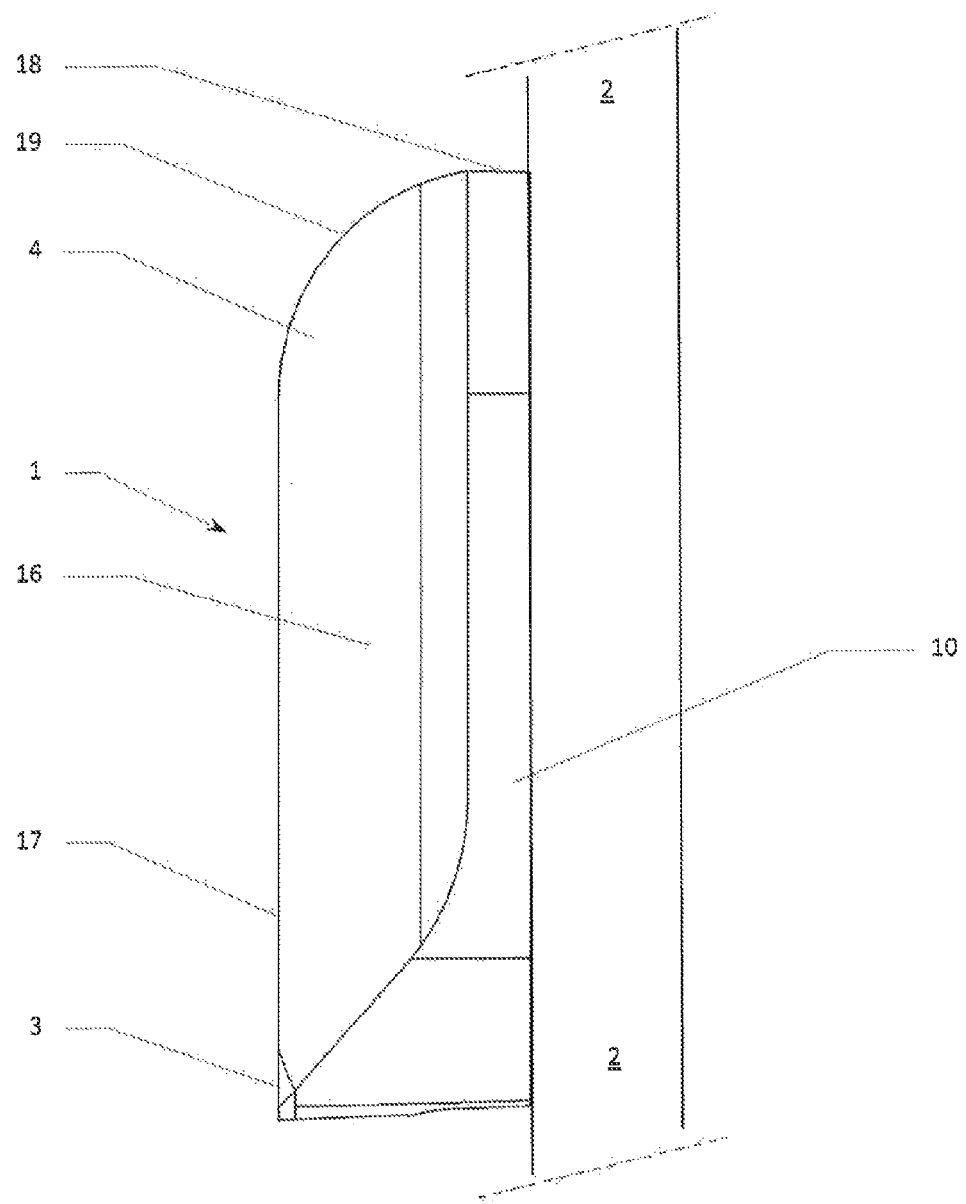

The transparent portion 3 is arranged in a housing, in a practical exemplary embodiment being otherwise opaque, dark colored, in the form of an elongate plastic cap 4, which is mounted on an elongate base 10 visible in FIG. 1b. The base in turn is mounted on the frame post 2, for instance with screws or the like. As shown by way of example in FIG. 2, the base can comprise a lower and an upper base plate 10a and 10b, respectively, which can preferably be metal base plates. The upper base plate 10b in this example comprises a raised central part 12, located between its longitudinal edges 11. Between the base plates 10a and 10b, in this example, a suitable packing 13 of insulating material is clamped. The raised portion 12 of the base plate 10b forms, on the side remote from the cap 4, together with a recess formed in the lower base plate, a chamber 14, in which in operation a schematically depicted printed circuit board 15 or a similar carrier with an electronic circuit of the reader is mounted.

The cap 4 contains the reader's antenna system, not explicitly shown in FIG. 2, which will be further described hereinafter. The cap 4 in this exemplary embodiment has, on opposite sides, sidewalls 18 bent towards each other, in this example connected with each other via a substantially flat top 17 extending in the longitudinal direction of the cap and near one end of the cap ending adjacent the transparent portion 3 and at the other end of the cap merging into a bent end face 19 widening towards a transverse end edge 18 of the cap.

Figure 2:
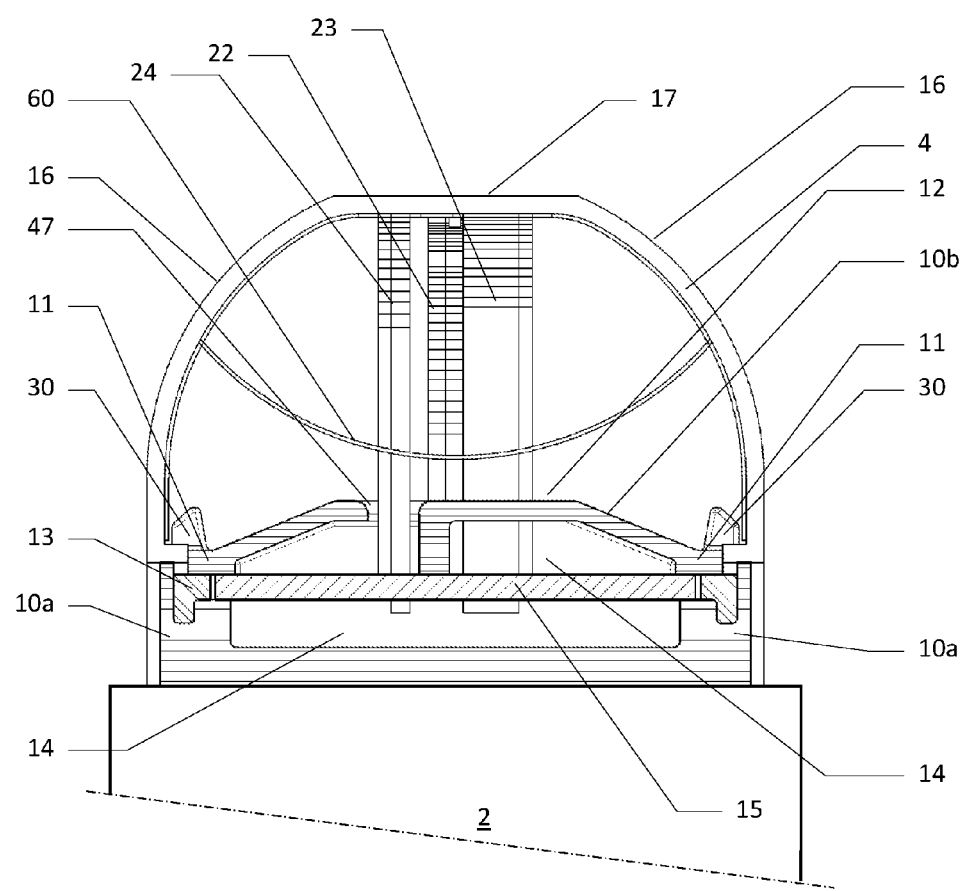

FIG. 2 furthermore shows, by way of example, tabs 30, which are formed on the upper base plate 10b and with which the cap 4 can be secured to the base plate. Furthermore, FIG. 2 shows schematically a positioning element 60, which will be further discussed hereinafter.

Figure 3A:
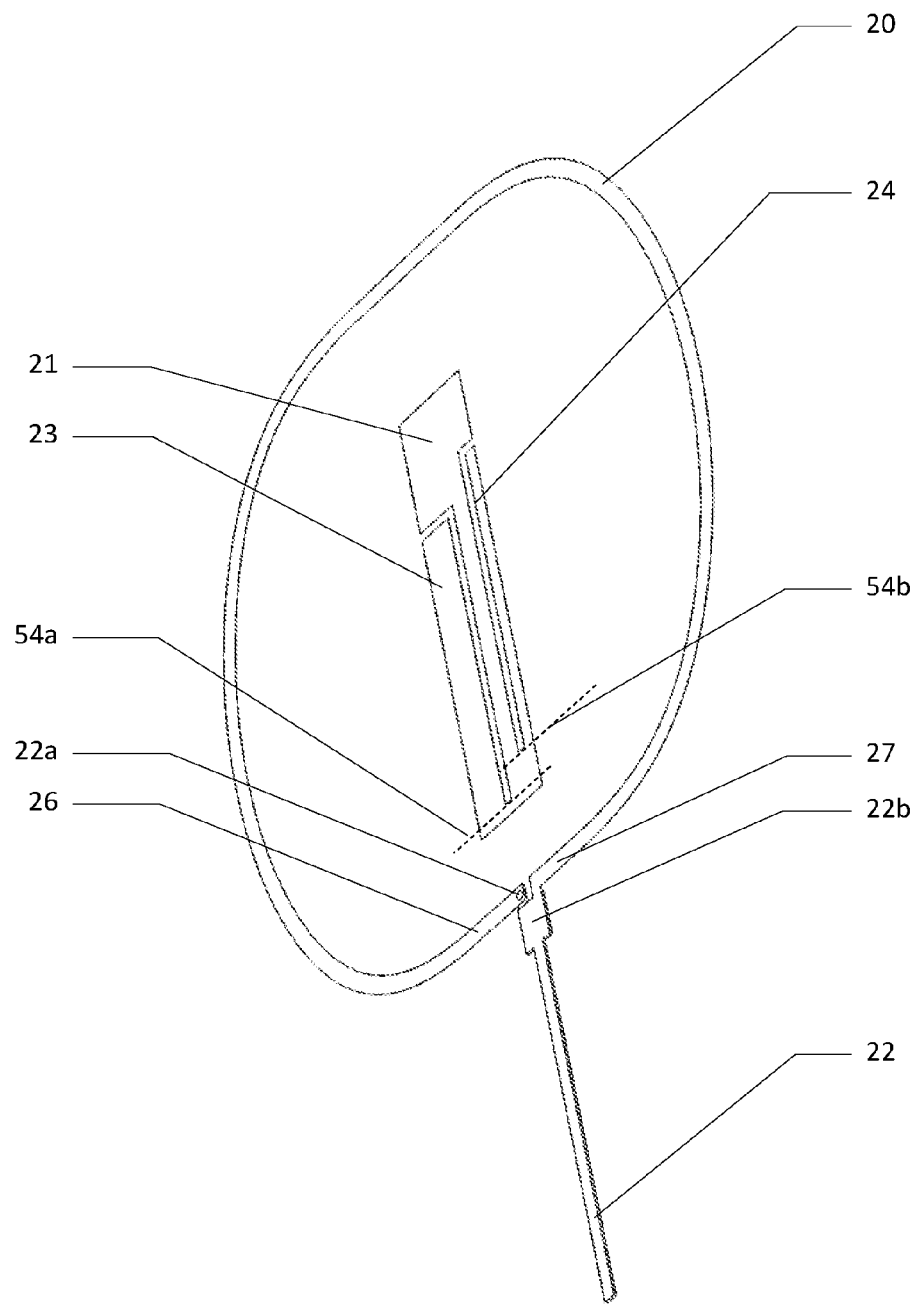
FIGS. 3a and 3b show schematically an example of an antenna system for a reader according to the invention depicted in the flat plane (FIG. 3a) and in a bent operating condition (FIG. 3b)
Figure 3B:
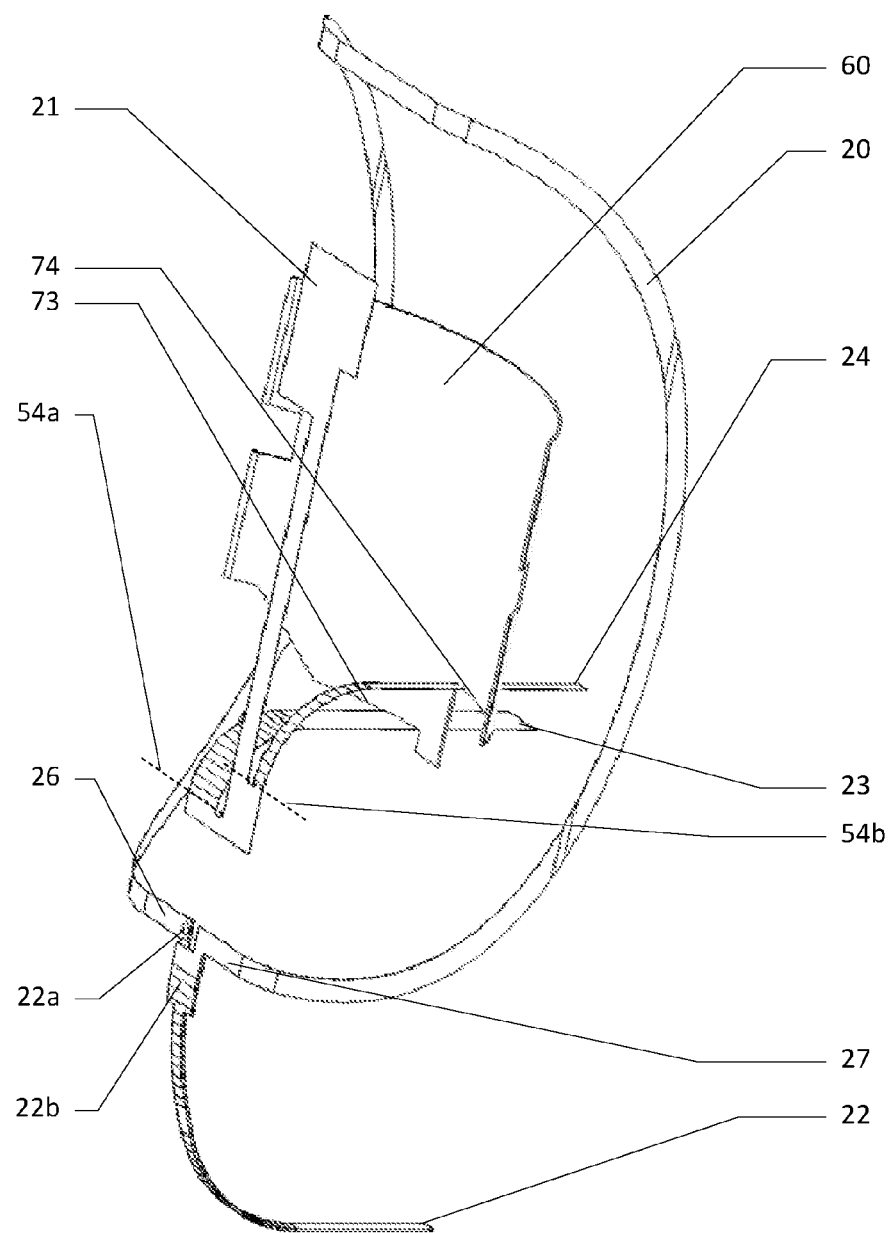

FIG. 3 shows schematically an example of an antenna system for use in a reader 1 according to the invention. FIG. 3a shows the antenna system in a flat plane, but in mounted condition, according to the invention, the system is in an at least partly bent plane, as shown in FIG. 3b, for instance against the inner side of the cap 4, as shown in more detail in FIGS. 4, 5 and 8.

The antenna system shown comprises according to the invention a loop antenna 20, which encloses an antenna of the inverted F-antenna type 21, commonly referred to as IFA. The loop antenna in operation, at least when the reader is mounted in vertical position, as when mounted on a frame post, provides a horizontally polarized interrogation field. The loop antenna is provided with a supply lead 22. The length of the loop is approximately one wavelength ($\lambda$) of the signals in the relevant frequency range. The supply lead 22 has a length of about ¼$\lambda$.

Situated in the free space within the loop antenna 20 is the IFA 21, which in operation generates a vertically polarized field. The antenna 21 has a mass lead 23 and a supply lead 24. The length of the IFA is about ¼$\lambda$ of the signals in the relevant frequency range.

It is noted that a reader in practice operates in a frequency range with a certain bandwidth. Only of one single frequency within that bandwidth can it be true that such a length measurement is exactly the wavelength $\lambda$ or ¼$\lambda$, etc. For all other frequencies in the frequency range, an approximation is involved. This is reflected by the expression "about".

An antenna of the IFA type, by virtue of its small size, is easy to integrate in a reader of small dimensions. However, this does not simply hold likewise for a loop antenna, which should have an antenna gain and bandwidth comparable to the IFA. To be able nonetheless to use a suitable loop antenna in a reader having a small width such as is dictated by the market, the loop antenna, according to the invention, is mounted in the reader in a form bent in at least one direction. The loop antenna may for instance be in a plane 25 that is bent in the form of a tunnel, extending above the base plate, as can be seen, for instance, in FIGS. 4 and 5. The width of the loop antenna 20 is thereby reduced, so that the loop antenna, with preservation of the desired loop dimensions, but now in a bent plane, can yet be built-in in a reader which has a smaller width than the diameter, or the desired width of the loop antenna in flat condition. As a result, the loop antenna, despite the small width of the reader, can yet have such dimensions that the so-called Chu/Wheeler limit, which relates to the bandwidth limitation of loop antennas, is not exceeded.

An additional advantage of this construction is that the loop antenna within the housing of the reader comes to lie at a greatest possible distance from the base. The performance of the loop antenna is thereby improved and the influence of background materials, such as the material of the mounting surface, in this case frame post 2, is thereby reduced.

Use of a metal base plate also contributes to a reduced influence of background materials, such as, for instance, a frame post and the like. Also, a metal base plate or base constitutes an electromagnetic shielding.

Another advantage is that the IFA in the free central area of the loop antenna can likewise be placed at a greatest possible distance from the base, so that it holds for this antenna, too, that performances are improved and the influence of the mounting surface is reduced, for the IFA has a length of only ¼ λ, which is smaller than the diameter, or the length, of the loop antenna.

Figure 4:
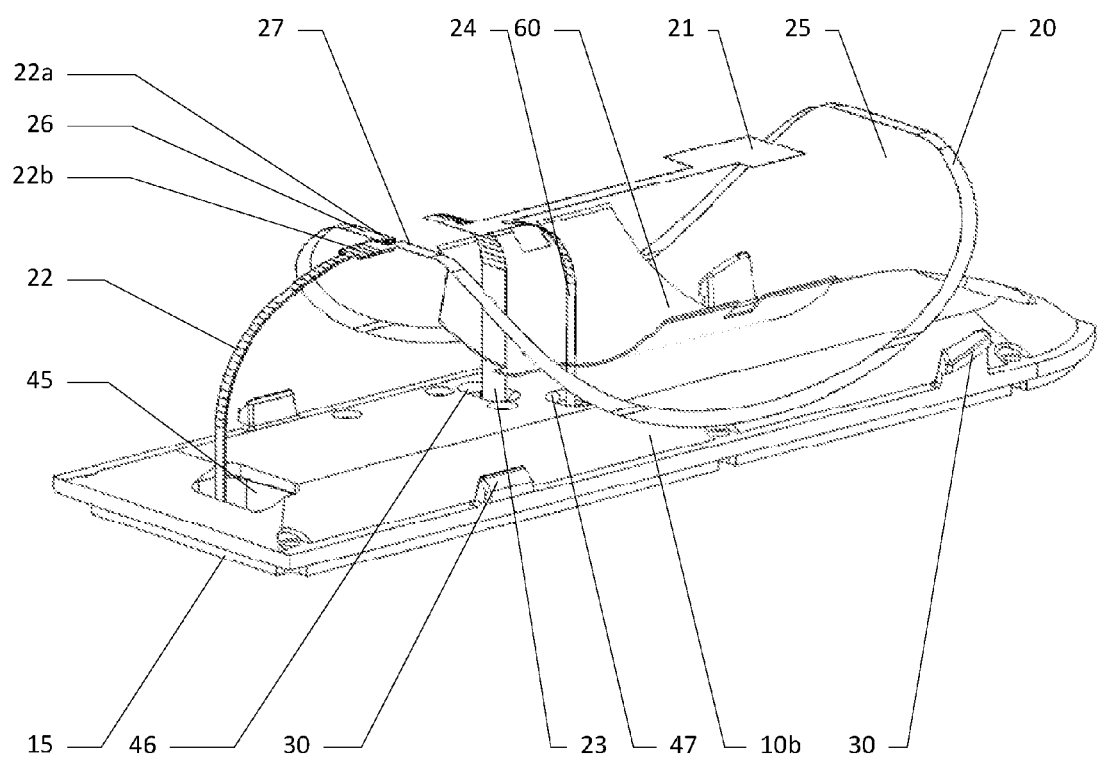
FIG. 4 shows schematically a view in perspective of an example of the positioning of the antenna system in a reader according to the invention, with the cap of the reader omitted.
Figure 5:
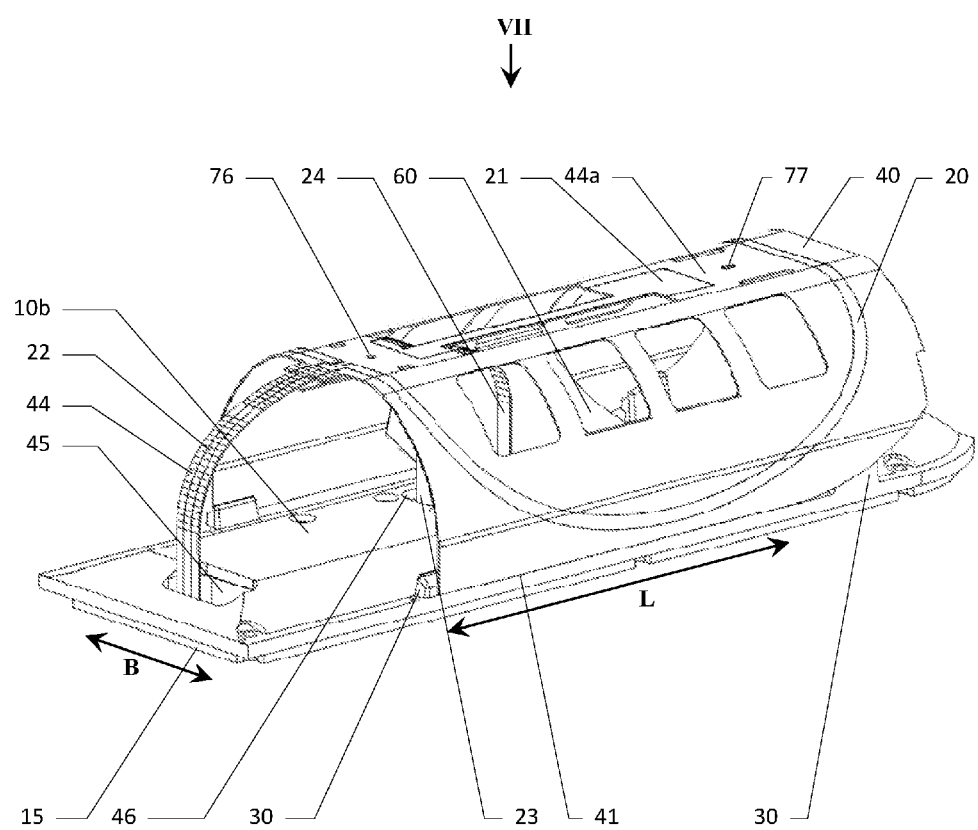
FIG. 5 shows schematically in perspective an example of an antenna system formed on a carrier, in a reader according to the invention.

The location of the loop antenna 20 and the IFA 21 with respect to each other and with respect to the base can be seen best in FIGS. 4 and 5.

The antenna 20 and 21 are preferably connected to the reader circuit via radio frequency (RF) switches, not shown. These make it possible, if desired, to choose between the two antennas and hence the associated polarization directions of the interrogation field. Thus, it is possible to switch alternately between the two polarization directions, so that the freedom of orientation of the tags is additionally safeguarded. It is also possible to drive the two antennas via a hybrid or phase displacement network, resulting in a circular field.

The above-described antennas 20 and 21 can be made in different manners. The antennas can be formed, for instance, from wire or strip material or the like, or from material evaporated onto a suitable carrier or the inner side of the housing 4. It is not necessary for the two antennas to be made in the same way. What is important is for the antennas to be form-retaining and stable in mounted condition.

In a preferred embodiment of the invention, the loop antenna 20 is arranged on a carrier 40 of thin flexible printed circuit board material, as can be seen in FIG. 5. The board material forms the earlier-mentioned plane 25 (FIG. 4). The inverted F-antenna 21 may be arranged on a similar carrier of a thin flexible board material. Preferably, though not necessarily, the two antennas are arranged on the same piece of material 40, as can also be seen in FIG. 5.

In a preferred embodiment of the invention, the supply lead 22 of the loop antenna is implemented as a parallel strip line having a length of about ¼λ. The supply lead forms a parallel strip line transformer, which provides for transformation of the low impedance of the loop antenna 20 to a level of preferably 50 ohm. The parallel strip line is connected through a via 22a and a T-junction 22b (see FIG. 3b) with the two ends 26, 27 of the loop antenna 20. The parallel strip line impedance of the T-junction 22b preferably has the magnitude of the loop antenna impedance. On the printed circuit board 15, in a practical exemplary embodiment, the transformation of the balanced parallel strip line to a micro strip line having an impedance of preferably 50 ohm can take place by means of a balun.

In the example of FIG. 5, the antennas 20 and 21 are jointly arranged on a single carrier 40 of thin flexible material. The carrier 40 in this example is bent in one direction and extends as a kind of tunnel above the base plate 10b in the longitudinal direction L of the base plate and the reader. The bending direction of the carrier corresponds to the width direction B of the base plate and the reader. The cap 4 can have on the inside thereof a flat portion that corresponds to the flat top 17. The carrier 40 can then, in mounted condition, have a corresponding flat portion 44a in which the IFA is situated. The carrier is preferably so arranged in the housing as to abut firmly and non-slidably against the inner side of the plastic cap 4, see FIG. 6. To this end, the cap 4 may be provided with locking means for fixing the carrier, such as, for instance, locking rims and/or locking tabs or other stop means, which, preferably in cooperation with the tensioning force generated in the carrier material by virtue of the bent condition, prevent a shifting or detachment of the antenna system.

Figure 6:
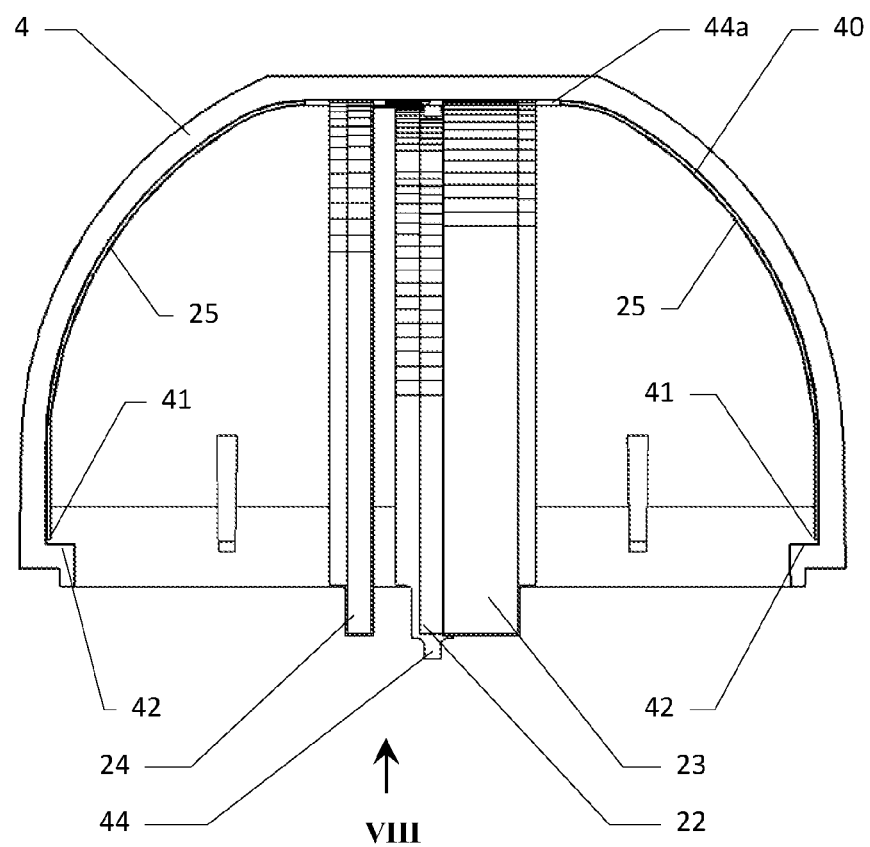
FIG. 6 shows schematically in a similar cross section to FIG. 2, but without base plate and frame post, an example of the attachment of a carrier of an antenna system in the housing of a reader according to the invention.

FIG. 6 shows schematically by way of example how the carrier can be retained in the cap in that the longitudinal edges 41 of the carrier 40 fall against thickened longitudinal edges 42 of the cap 4. Shifting in the longitudinal direction can be prevented, for instance, with the aid of similar tabs or a rib in transverse direction and/or, for instance, by closing off the longitudinal edges 42 at one or both ends, or the like.

Figure 7:
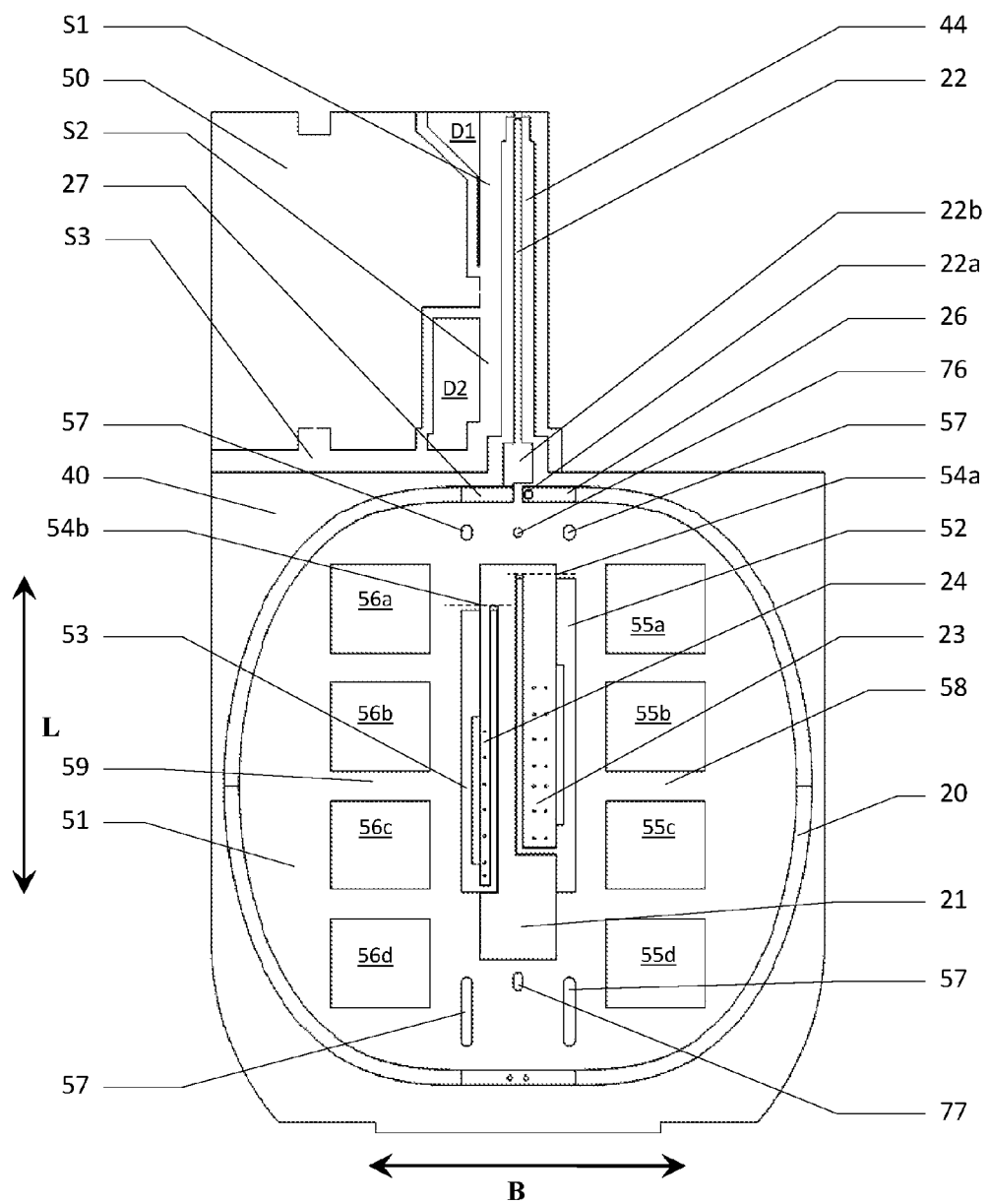
FIG. 7 shows an example of an antenna system according to the invention arranged on a flexible carrier, which, however, is still in flat condition.
Figure 8:
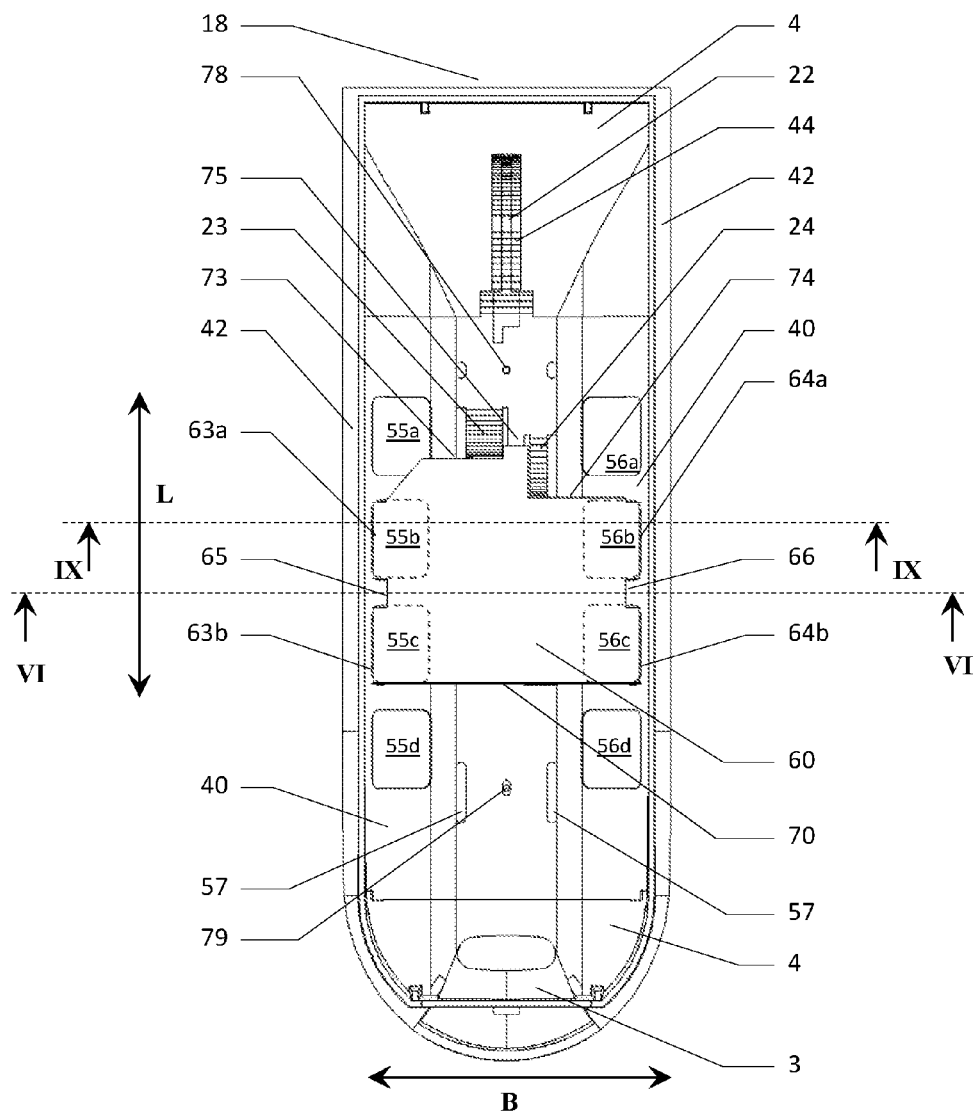
FIG. 8 shows schematically a similar antenna system to that shown in FIG. 7, but in a form bent into a U-shape to some extent, viewed from the open side of the U-shape according to the arrow VIII in FIG. 6, with the cap of the reader shown as well.

For instance, in carrier 40 a circular hole 76 and a slotted hole 77 may be used, preferably on the central axis of carrier 40 (FIG. 7), to fix the carrier 40 in the length direction L by means of pins 78 and 79 on the inner side of cap 4 (FIG. 8).

In the example shown in FIG. 5, the carrier 40 is provided at one end with a central strip-shaped projection 44, which preferably forms one whole with the carrier 40 and which carries the parallel strip line 22 of the loop antenna. The strip-shaped projection 44 in mounted condition preferably lies at least partly against the inner surface of the cap 4 and is bent in the direction of the base plate 10b. The free end reaches through an opening 45 (FIG. 4) provided in the base plate 10b and, on the other side of the base plate, is connected with an electric circuit, for instance a balun, of the reader, which is on the printed circuit board 15 or similar carrier.

The mass lead 23 and the supply lead 24 of the IFA are preferably formed on strips of the carrier 40 that were originally situated next to the IFA but have later been cut loose therefrom and bent to the base plate 10b. These strips likewise have their free ends reaching through openings 46 and 47 provided in the base plate 10b, as indicated in FIG. 4, and are also connected with the electronic circuit of the reader.

FIG. 7 shows an example of a carrier 40 of a suitable thin, resilient and flexible printed circuit board material, on which an antenna system 20 through 24 according to the invention is arranged. For this, in itself, different techniques and materials are known, which are not part of the invention and for that reason are not further described here.

The carrier shown in FIG. 7 has not yet been brought into the final bent condition, but is represented in flat condition. The loop antenna 20 and the inverted F-antenna 21 in the condition of FIG. 7 are still in the same flat plane and also the connecting leads 22, 23 and 24 of the antennas are still in the flat plane mentioned.

In the condition shown in FIG. 7, the carrier is already provided, for the most part, with the desired circumferential form, which, in this example, is broadly rectangular, having on one side (the top side in the drawing) in the central area the above-described projecting tongue or strip 44, which carries the parallel strip line feeder 22 of the loop antenna. Furthermore, to the left of the tongue 44, a rectangular part 50 is present, which, in a later stage, will be cut off along the thick black lines S1, S2, and S3 and whose function will be described later.

In the central area 51 of the carrier 40, enclosed by the loop antenna 20, there is, in line with the tongue 44, the IFA 21. The connecting leads, that is, the mass lead 23 and the supply lead 24, can be cut loose by means of U-shaped cuts 52 and 53, respectively, and can then be bent along bending lines 54a, 54b out of the plane of the carrier into the position shown in FIGS. 4 and 5.

In the central area 51, in this example, furthermore, on opposite sides of the IFA a number of substantially rectangular openings 55a, 55b, 55c, 55d, and 56a, 56b, 58c, 56d, respectively, are provided. Further, in this example, two more elongate openings 57 are provided, which extend substantially in line with the outer parts of the cuts 52 and 53.

The openings 55, 58 and 57 simplify the mounting of the carrier in the desired bent position in the housing of the reader, in that the carrier, due to the presence of the openings, bends more easily and is manipulate more easily.

According to a further elaboration of the invention, the rectangular openings can furthermore be used for arranging a positioning element, which serves to keep the connecting leads 23, 24 of the IFA, during assembly of a reader, in the correct bent position to enable the ends of these leads to be passed through the openings 48, 47 in the base plate 10b and corresponding openings in the printed circuit board 15. After the assembly, the positioning element serves as support for the connecting leads 23, 24 of the IFA.

Figure 9:
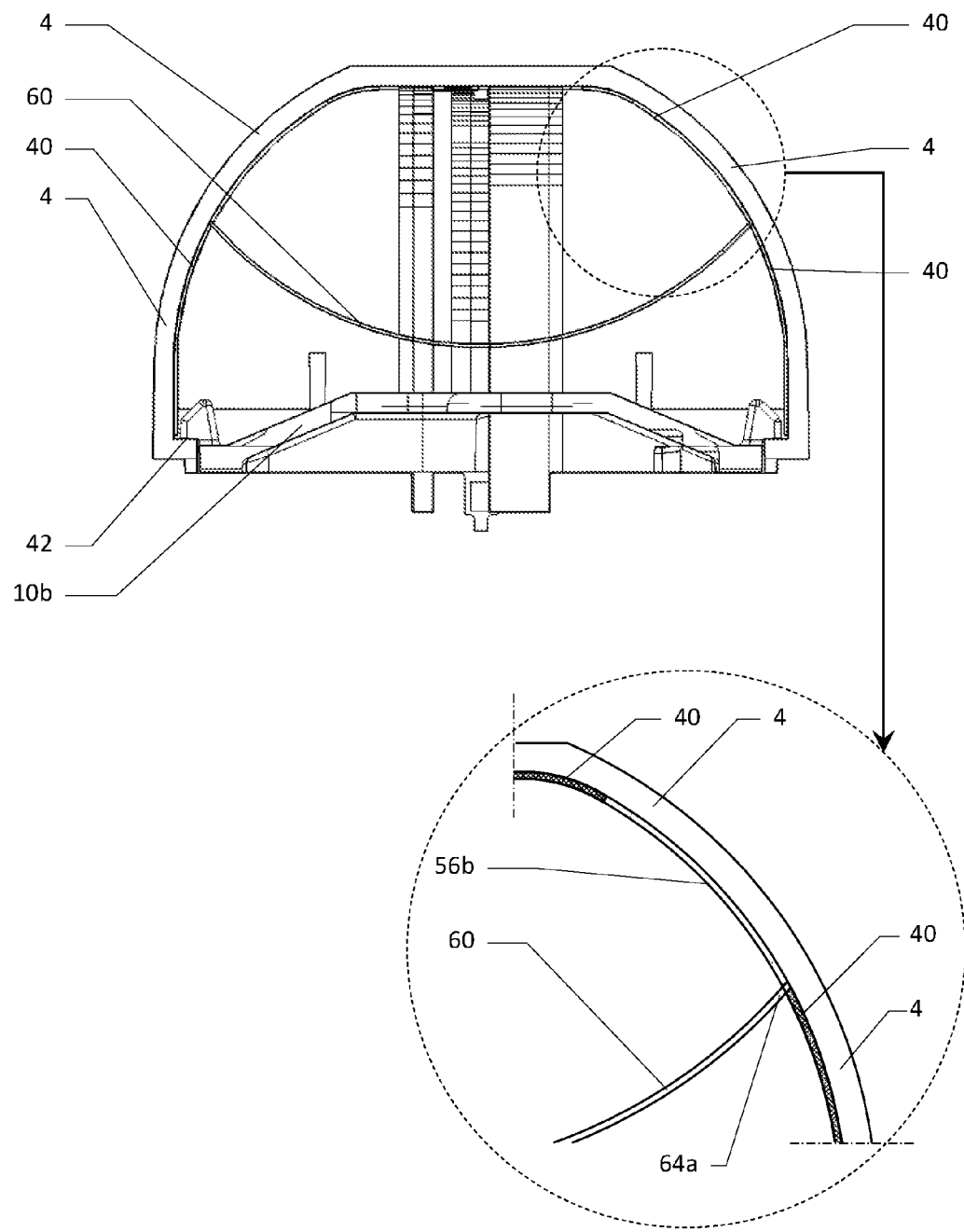
FIG. 9 shows a cross section along the line IX-XX in FIG. 8, with the cap of the reader shown as well.

FIG. 8 shows schematically a carrier 40 of the kind shown in FIG. 7. The carrier 40 shown in FIG. 8 has been brought in the desired bent condition and is depicted according to the view indicated in FIG. 6 with the arrow VIII. The cap 4 is shown in FIG. 9, in which a cross section along the line IX-IX in FIG. 8 is represented. It is noted that in FIG. 7 the carrier is shown in a view from the side of the cap as indicated with an arrow VII in FIG. 5, while in FIG. 8 a view from the opposite side is shown.

In FIG. 7 and FIG. 8 the length direction and the width direction L and B, respectively, of the reader 1 are indicated. It can be clearly seen that the carrier, shown in FIG. 7 in flat condition and in FIG. 8 in a position bent transversely to the length direction L, in FIG. 8 apparently has a smaller dimension, compared with FIG. 7, in the width direction in relation to the dimension in the length direction. This, however, does not apply to the tongue 44, which, in the operating condition, in contrast to the (in this example) substantially rectangular part of the carrier 40, is bent transversely to the width direction B, as can also be seen in FIGS. 4 and 5, and hence in FIG. 8 apparently has a smaller length than in FIG. 7.

Also the connecting leads 23, 24 of the IFA are bent transversely to the width direction B as can also be seen in the FIGS. 4 and 5. The connecting leads are supported in the operating condition by a positioning element 60, which is formed from the rectangular part 50 mentioned earlier and shown in FIG. 7.

Figure 10:
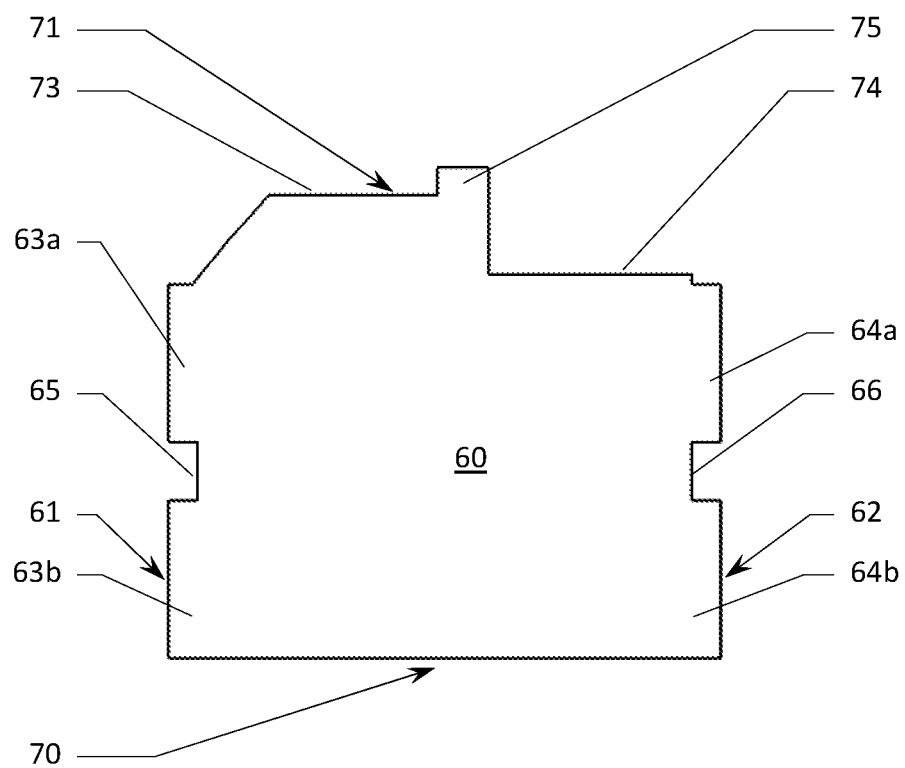
FIG. 10 shows schematically an example of a positioning element according to the invention in flat condition.

An example of a suitable positioning element 80 can be seen in the bent operating condition in FIGS. 8 and 9, and for clarity's sake is once more shown separately, in flat condition, in FIG. 10.

The depicted positioning element 60, in the example described, is manufactured from the same piece of thin flexible printed circuit board material as the carrier 40 of the antenna system. The positioning element 80 is obtained by snipping or cutting or milling, or the like, the substantially rectangular part 50 loose from the flexible carrier 40 along the contours S1, S2 and S3 and thereupon, reducing the substantially triangular part D1 and the substantially rectangular part D2 by snipping off or cutting or milling or the like.

The thus obtained positioning element has two longitudinal sides 61, 62 (FIG. 10), which, in this example, are substantially parallel and which, in this example, each form two juxtaposed broad lips 63a, 63b and 64a, 64b, respectively, which are separated from each, other by a recess 65 and 66, respectively. The lips 63a, 63b and 64a, 64b in this example are as wide as the openings 55 and 56, while the recesses 65, 68 in this example are as wide as the parts 58, 59 (FIG. 7) located between the respective openings 55b and 55c, and 56b and 58c, respectively, of the carrier 40.

In the mounted operating condition shown in FIGS. 8 and 9, the lips 63a, 63b reach into the openings 55b, 55c of the carrier 40, while the lips 64a, 84b reach into the openings 58b, 58c, The positioning element 60 is then in a condition bent oppositely to the carrier 40, with the lips resting against the outer edges of the respective openings 55b, 55c, and 58b, 58c, respectively, while the recesses 65, 66 bridge and closely embrace the parts 58, 59 located between the respective openings 55b, 55c and 58b, 58c, respectively.

Although the material of the carrier is very thin, the lips of the positioning element, by virtue of the spring force generated therein in the bent condition of the material, are forcefully pressed into the corresponding openings of the carrier and against the inner wall of the cap 4. The positioning element 60 is thereby firmly fixed. The lips cannot spring out of the openings in the carrier, nor can the positioning element shift in the longitudinal direction of the reader.

FIG. 8 shows schematically how the lips 63a and 64a reach into the corresponding openings 55b and 56b. FIG. 9 shows this construction in more detail in cross section. The lips cannot move down (in FIG. 9) because the longitudinal edges of the openings prevent this. Nor can the lips shift in the longitudinal direction, because the transverse edges of the openings in the carrier prevent this.

As shown in FIG. 10, the positioning element 60, in this example, furthermore has a first, straight, transverse edge 70 and a second transverse edge 71, which is profiled. The second transverse edge 71, in this example, has two mutually staggered sections 73, 74, which are both parallel to the first transverse edge 70, but are at different distances from the first transverse edge. The sections 73, 74 are separated from each other by a finger-shaped projection 75 located between the sections.

The sections 73 and 74 form supporting edges for the strip-shaped connecting leads 23, 24 of the IFA, bent out of the plane of the carrier 40. In the operating condition, the bent connecting leads resiliently rest near their free ends against the supporting edges 73, 74 on opposite sides of the finger-shaped projection 75, as can be seen best in FIG. 3b. The position of the supporting edges 73, 74 relative to the lips 63a, 63b and 64a, 64b, and hence relative to the carrier 40, is such that after assembly of the carrier 40 and the positioning element 60 in the cap 4, free ends of the connecting leads 23, 24 which extend beyond the supporting edges are located precisely opposite the openings 46 and 47 in the base plate 10b and without effort can be inserted simultaneously through these openings by moving the cap 4 and the base plate 10b towards each other. Thereupon, the ends of the connecting leads can be connected by soldering or in any other suitable manner to the circuit located behind the base plate on printed circuit board 15 or the like.

It is noted that after the foregoing, diverse modifications will be obvious to the skilled person. Thus, as already indicated, the antennas can be made in different manners, for instance, by evaporation onto one or more suitable carriers or on the inner side of the elongate, domed cap 4. Also, the loop antenna may be formed from strip material and/or wire material. The IFA may be manufactured from plate material. If evaporated or printed antennas are used, the antennas may be arranged on separate carriers.

The shape of the joint carrier described and the openings provided therein can be varied in many ways obvious to those skilled in the art. This also applies to the shape of the positioning element described.

These and similar modifications are obvious to those skilled in the art and are understood to be within the scope of the invention, as defined in the appended claims.

The invention claimed is:

1. A reader for an electronic UHF access control system, wherein the reader in operation cooperates with corresponding UHF tags and is provided with a housing, in which an antenna system for creating an electromagnetic interrogation field is arranged, wherein the antenna system comprises a first antenna for generating an interrogation field with a first polarization direction, and a second antenna for generating an interrogation field with a second polarization direction, wherein the first and the second polarization directions are substantially orthogonal to each other, and wherein the first antenna is a loop antenna with an open central area, and the second antenna is an antenna of elongated shape of the inverted F type (IFA), which is placed in the open central area of the loop antenna; wherein the housing is a housing of elongate shape and has a length direction (L) and a width direction (B) wherein the IFA extends in the length direction (L) of the housing, and wherein the loop antenna is bent at least in the width direction (B) of the housing, at both sides of the IFA.

2. The reader according to claim 1, wherein the antennas are so dimensioned that the antenna gain and the bandwidth for the first and second polarization directions have a comparable magnitude.

3. The reader according to claim 2, wherein the IFA has a length of one-fourth of the wavelength λ of one of the signals within the bandwidth in which the reader operates, and that the loop of the loop antenna has a length of one wavelength λ of one of the signals within the bandwidth in which the reader operates.

4. The reader according to claim 1, wherein the housing comprises an elongate cap and an elongate base, wherein the loop antenna is at a distance above the base and is bent in a tunnel-shape, said tunnel-shape extending in the length direction (L) of the cap and the base between the longitudinal edges of the base and above the base.

5. The reader according to claim 4, wherein the IFA extends in the tunnel-shape of the loop antenna and in the area thereof located highest above the base.

6. The reader according to claim 5, wherein the tunnel-shape is defined by at least a part of the inner wall of the cap.

7. The reader according to claim 4, wherein the tunnel-shape is formed by a carrier of thin resilient and flexible printed circuit board material, on which at least the loop antenna is arranged.

8. The reader according to claim 7, wherein the IFA is arranged on the same carrier as the loop antenna.

9. The reader according to claim 8, wherein the carrier is located at least partly against the inner wall of the cap wherein the inner wall of the cap is provided with locking means for fixing the carrier.

10. The reader according to claim 8, wherein on the carrier also strip-shaped connecting leads for the antennas are formed, which have been cut loose along their longitudinal edges and one of their transverse edges from the carrier and in the operating condition are bent out of the plane of the carrier in the direction of the base.

11. The reader according to claim 10, wherein the base has an upper base plate and a lower base plate wherein said upper base plate has a central portion raised in the direction of the cap, under which an electronic circuit of the reader is located, wherein the upper base plate is provided with openings via which the connecting leads of at least one of the antennas are connected with the circuit.

12. The reader according to claim 10, further comprising a positioning element for fixing at least one of the strip-shaped connecting leads in the bent position.

13. The reader according to claim 12, wherein the positioning element is manufactured from the same material as the carrier and in operation is arranged in the cap in a position bent oppositely to the carrier, wherein the positioning element has at least one supporting edge for fixing at least one connecting lead in the desired bent position, wherein the positioning element is furthermore provided on opposite sides with lips which engage in one or more of openings for fixing the positioning element, and wherein the openings are provided on the carrier, on opposite sides of the IFA but within an area enclosed by the loop antenna, and the openings facilitate the mounting of the carrier in the bent condition in the cap.

14. The reader according to claim 8, wherein the carrier is provided with a number of openings, on opposite sides of the IFA but within an area enclosed by the loop antenna, which openings facilitate the mounting of the carrier in the bent condition in the cap.

15. An electronic UHF RFID access control system including a reader according to claim 1, wherein the reader is mounted on a standard door frame post and had a width (B) not larger than the width of said door frame post.

* * * * *